United States Patent [19]

Hara et al.

[11] Patent Number: 4,764,427
[45] Date of Patent: Aug. 16, 1988

[54] FIBER HAVING THERMOPLASTIC RESIN COATING

[75] Inventors: Shigeyoshi Hara; Hiroo Inata; Shunichi Matsumura, all of Iwakuni, Japan

[73] Assignee: Teijin Limited, Osaka, Japan

[21] Appl. No.: 898,607

[22] Filed: Aug. 21, 1986

[30] Foreign Application Priority Data

Aug. 22, 1985 [JP] Japan ................................. 60-182946

[51] Int. Cl.$^4$ .............................................. D02G 3/00
[52] U.S. Cl. .................................... 428/400; 428/366; 428/367; 428/373; 428/374; 428/375; 428/376; 428/392; 428/394; 428/395; 428/397; 427/407.1
[58] Field of Search ............... 428/367, 392, 376, 397, 428/398, 400, 408, 366, 373, 374, 375, 394, 395

[56] References Cited

U.S. PATENT DOCUMENTS 3,849,181 11/1974 Green ................................. 428/400

Primary Examiner—Sharon A. Gibson
Attorney, Agent, or Firm—Sherman and Shalloway

[57] ABSTRACT

A fiber having a porous coating of a thermoplastic resin, wherein
at least a part of the surface of the fiber is coated with the porous coating of the thermoplastic resin, and
the thermoplastic resin of the coating
(A) is different from a material forming the matrix of the fiber,
(B) is present in a proportion of 5 to 100% by weight based on the fiber matrix, and
(C) is porous such that a group of micropores having a pore diameter in the range of 0.1 to 1 micrometer are present in a volume of 100 to 500 mm$^3$/g; and a bundle of fibers bonded to one another having at least a part of the coating in common. This bundle is useful as a prepreg for a fiber-reinforced composite material.

14 Claims, No Drawings

FIBER HAVING THERMOPLASTIC RESIN COATING

This invention relates to a fiber (filament) and a fiber bundle having a coating of a thermoplastic resin, a prepreg composed of the fiber bundle for use in a composite material, and processes for producing them.

Fiber-reinforced composite resin materials have a high specific strength and specific Young's modulus, and are finding extensive application as light-weight high strength structural materials in transportation facilities in aerospace, ships and vehicles, automation machines and instruments, and sporting goods, and as functional parts of machines and instruments in highly advanced industries.

Heretofore, thermosetting resins such as epoxy resins, phenolic resins and unsaturated polyester resins have been exclusively used as matrix resins for composite materials reinforced with long fibers. This is presumably because the thermosetting resins have good moldability before curing, and become insoluble and infusible after curing and gain high dimensional reliability.

In recent years, reinforcing fibers have been improved and gained higher elongation, and it has been desired to develop matrix resins having a higher toughness matching the improved property of the reinforcing fibers. It was discovered that such matrix resins can be obtained as a result of development of thermoplastic engineering resins having excellent thermal stability and mechanical strength. Thus, the use of such thermoplastic resins as matrix resins has attracted attention.

If such a thermoplastic resin is used as a matrix resin, it can be easily molded by melting, and its processability is better than the processability of a thermosetting resin which requires a long period of time for curing reaction. Consequently, the use of such a thermoplastic resin can give composite materials at low costs.

Thus, the use of thermoplastic resins has been desired both in view of their properties and cost. In using the thermoplastic resins as matrix resins, however, technical problems arise which are different from those in the case of using thermosetting resins as matrix resins.

In order that the matrix resin may function properly, each of the reinforcing fibers should be enveloped with the matrix resin. However, unlike thermosetting resins in the A-stage, a thermoplastic resin, particularly a thermally stable engineering resin, is highly viscous even in the molten state, and it is difficult to coat it uniformly on each of the single fibers. Moreover, whether in the form of a prepreg or a strand, the reinforcing fibers coated with the thermoplastic resin are stiff and rigid and have no drapability at room temperature. Hence, unless prepregs or strands of the reinforcing fibers are heated to a temperature above the softening point of the resin, it is difficult to stack the prepregs or wind the filaments of the strands.

In order, therefore, to use a thermoplastic resin as a matrix resin of a fiber-reinforced composite material using long fibers, it is necessary to (A) use an improved method of coating the resin on the fibers so that the resin coating may be applied sufficiently and uniformly to the single fibers and (B) either (a) improve the method of molding the resulting resin coated strand or one-way prepreg so as to mold it only when the resin is heat-softened, or (b) devise a particular form of the coated fibers which makes it possible to retain their flexibility.

Prepregs or strands obtained by using the polyether ether ketone (PEEK) resin recently announced by ICI and prepregs obtained by using the PPS resin of Phillips Petroleum are examples of the former method (a) in which the method of molding the prepregs is different from the conventional one.

On the other hand, to retain flexibility as in (b) above, there was proposed a method which comprises passing reinforcing fibers through a fluidized bed of a powdery resin for powder coating such as nylon or polyester while spreading the fibers so that each and every single fiber of the reinforcing fibers is sprinkled with the powder, and melt adhering the powder to the outermost layer of the fiber bundle as if to cover the fiber strand with a tube.

According to this method, the resin exists as a powder in the inside of the fiber bundle, and the fiber bundle is not entirely melt-adhered. Hence, the fiber bundle as a whole retains flexibility, and the outside tube thus prevents the resin powder from dissipating out of the fiber bundle. Hence, if this tubular fiber bundle is molded and melt-adhered by, for example, the filament winding method, there can be obtained a molded article in which each of the reinforcing fibers is coated with the resin. This method, however, has the disadvantage that since the matrix resin used should be in very finely divided form usable as a powder paint, the type of the resin that can be used is limited.

Japanese Laid-Open Patent Publication No. 25894/1975 discloses a process for producing a woven fabric material coated with a polyamide, which comprises treating the woven fabric with a solution of the polyamide and benzenesulfonic n-butylamide as a plasticizer in formic acid, and then treating the fabric with water to deposit the polyamide on it. This patent document states that the use of this particular plasticizer gives fibers which are soft and pliable and have very high abrasion resistance.

It is an object of this invention to provide a fiber or a bundle of fibers having a porous coating of a thermoplastic resin.

Another object of this invention is to provide a fiber or a bundle of fibers having a porous coating of various thermoplastic resins, which has pliability sufficient to be wound up on a bobbin or the like.

Still another object of this invention is to provide a prepreg which has pliability sufficient to be wound up on a bobbin or the like which easily gives a fiber-reinforced composite material or its molded article containing a thermoplastic resin forming a film as a matrix by aligning it in one direction or helically winding it by the filament winding method and subjecting it to a temperature, and as required a pressure, which are sufficient to melt-adhere the thermoplastic resin.

Yet another object of this invention is to provide processes for producing the aforesaid fiber, fiber bundle and prepreg of this invention having a porous coating.

Further objects of this invention along with its advantages will become apparent from the following description.

In accordance with this invention, the above objects and advantages of this invention are achieved by a fiber having a porous coating of a thermoplastic resin, wherein at least a part of the surface of the fiber is coated with the porous coating of the thermoplastic resin, and the thermoplastic resin, of the coating (A) is different from the material forming the fiber, (B) is present in a proportion of 5 to 100 % by weight based on the fiber and (C) is porous such that a group of micropores having a pore diameter in the range of 0.1 to 1 micrometer are present in a volume of 100 to 500, preferably 150 to 400, $mm^3/g$; and by a bundle of fibers having a porous coating of a thermoplastic resin, wherein at least a part of the surface of the fibers is coated with the porous coating of the thermoplastic resin, the thermoplastic resin of the coating in the individual fibers (A) is different from the material forming the fibers, (B) is present in a proportion of 5 to 100% by weight on an average based on the fiber matrix, and (C) is porous such that a group of micropores having a pore diameter in the range of 0.1 to 1 micrometer are present in a volume of 100 to 500 $mm^3/g$ on an average, and (D) the fibers are bonded to one another having at least a part of the coating in common.

According to this invention, the above fiber and a fiber bundle can be produced by a process which comprises (1) contacting (A) a fiber or a plurality of fibers with (B) a solution or suspension containing at least a part of a thermoplastic resin dissolved therein, said thermoplastic resin being different from a material forming the fiber or fibers (A) to adhere the solution or suspension of the resin (B) to the surface of each fiber (A), and (2) thereafter contacting the fiber or fibers (B) with a coagulating liquid which does not substantially dissolve the thermoplastic resin but is miscible with the solvent forming said solution or suspension to deposit the thermoplastic resin as a porous coating onto the fiber surface.

The fiber or fibers (A) used in this invention have a mechanical strength of preferably at least 5 g/de, more preferably at least 10 g/de, especially preferably at least 15 g/de. Preferably, these fibers (A) have durability at the melt-adhesion temperature of the thermoplastic resin (B) to be described and to the solvent for the thermoplastic resin (B). Each fiber preferably has a diameter of 0.5 to 5 de.

Examples of such fibers include carbon fibers such as so-called carbon fibers and graphite fibers; aramide fibers obtained from poly(p-phenylene terephthalamide), poly(3,4'-oxydiphenylene terephthalamide), p-phenylene terephthalamide copolymer, a polycondensate between p-aminobenzoic acid hydrazide and terephthaloyl chloride; fibers from heterocyclic polymers such as poly-1,2,4-oxadiazole-N-methyl terephthalic hydrazide copolymer, poly(p-phenylenebibenzothiazole), poly(p-phenylenebibenzoxazole), and poly(2,5-benzoxazolylene); high Young's modulus high tenacity organic fibers such as polyarylate and polyazomethine; fibers from thermoplastic resins having a relatively low melting point such as polyoxymethylene, polyethylene, polyvinyl alcohol, nylon and glycol-type polyesters; glass fibers from S-glass, E-glass, high silica glass and quartz; ceramic fibers from alumina, silica-alumina, zirconia, silicon carbide and silicon nitride; and boron fibers.

Among these fibers, the carbon fibers are most preferably used. Generally, many fibers from thermoplastic resins having a relatively low melting point such as polyoxymethylene have softening points close to the softening points of the thermoplastic resins used in this invention as a coating. If such thermoplastic resins are used to produce fibers, they should have much lower softening points than the thermoplastic resins for forming the porous coating. Preferably, the glass fibers, ceramic fibers and boron fibers are treated prior to use so as to increase their adhesion to the thermoplastic resin.

The thermoplastic resin for forming a porous coating on the fibers may be any of general-purpose thermoplastic resins, general-purpose engineering resins, heat-resistant engineering resins. The general-purpose engineering resins and heat-resistant engineering resins are especially preferred in view of their properties.

Specific examples of such resins include polybutylene terephthalate, polyethylene terephthalate, polycarbonate, various nylons such as nylon 6, 6.6, 6.10, 11, and 12 nylons, polyoxymethylene, polyarylates, polyarylene ether sulfones, polyamideimides such as poly(4,4'-oxydiphenylene trimellitamideimide), polyether imides, thermoplastic polyimides, polyether ether ketone, poly(pphenylene sulfide), polyvinyl chloride, polyacrylates, polymethacrylates, polystyrene resins, modified polyethylene resins such as ethylene/vinyl acetate copolymer, and polyester elastomers.

Those thermoplastic resins which are amorphous or sparingly crystalline preferably have a glass transition temperature of at least 100° C., especially at least 150° C. Those thermoplastic resins which are crystalline especially highly crystalline, preferably have a crystalline melting point of at least 200° C. irrespective of whether or not their glass transition temperature is at least 100° C.

The thermoplastic resin is applied to the surface of the fibers in the form of a solution or suspension. The liquid medium forming the solution or suspension is preferably miscible with water or alcohols, and should not have too low a boiling point nor be highly volatile. Generally, the liquid medium desirably has a boiling point of at least 100° C. When the thermoplastic resin used is an engineering resin or a thermally stable engineering resin, a polar solvent, especially an organic polar solvent, is used.

Examples of the liquid medium are amide-type solvents such as N-methylpyrrolidone, N,N-dimethylacetamide and dimethylformamide; phenolic solvents such as phenol or cresol; and sulfur oxide-containing solvents such as dimethyl sulfoxide and tetramethylenesulfone.

The solution or suspension of the thermoplastic resin is prepared by dissolving or suspending the thermoplastic resin in the liquid medium in a concentration of preferably 4 to 40% by weight, preferably 8 to 30% by weight. The viscosity of the solution is adjusted preferably to not more than 1,000 centipoises, more preferably to not more than 500 centipoises. The solution may of course be maintained at a temperature other than ordinary temperatures in order to control the amount of the thermoplastic resin dissolved and the viscosity of the solution.

By preparing the resin solution or suspension in this manner, it is possible to control the amount of the solution adhering to the fibers and therefore the pick-up of the resin.

The solution or suspension is applied to the fibers in a proportion of 5 to 100% by weight, preferably 10 to 80% by weight, especially preferably 20 to 70% by weight. If the pick-up of the thermoplastic resin is too large, the flexibility of the fibers having the resin coating is reduced. If it is too small, many voids remain in the interstices of the fibers even after melt adhesion and are liable to become defects.

The solution or suspension so prepared is brought into contact with a fiber or a bundle of fibers. Generally, the fiber bundle is conveniently used in the form of a strand consisting of 500 to about 20,000 filaments. In applying the solution or suspension, such a strand may be used singly, or a plurality of such strands may be used by aligning- them parallel to each other. Alternatively, a plurality of such strands may be combined together.

By this contacting, the solution or suspension should be applied sufficiently to the individual fibers. For example, there may be used a method in which the strand is continuously immersed in a pool of the solution or suspension while, as required, spreading the strand, to impregnate the liquid in the interstices of the fibers, and then the bundle is squeezed by a roller or a felt to control the pick-up of the liquid.

Other methods may be used. For example, the strand is spread laterally and the solution or suspension is applied by a felt or a roller. Alternatively, the solution or suspension may be applied by a spray, or a known method of applying a textile surface finishing agent to fibers may also be employed.

The fiber bundle to which the resin solution has been adhered is then contacted with a coagulatrng liquid which does not dissolve the thermoplastic resin but is miscible with the liquid medium constituting the solution or suspension.

The coagulating liquid is selected according to the combination of the resin and the solvent. For handling, the coagulating liquid preferably has resistance to combustion and has not so high a vapor pressure. From this viewpoint, the coagulating agent is preferably water, alcohols, glycols, and halogenated hydrocarbons, and water is most preferred.

As a result of contact with the coagulating liquid, the resin is deposited and coagulated in a porous form, and the solvent is removed, whereby a porous coating of the resin is formed on the fiber surface. For industrial practice, it is desirable to use a method in which the fibers are immersed in the coagulating liquid and continuously passed through it for a predetermined period of time. In this case, the coagulating liquid is desirably used in several portions in order to effect coagulating and solvent extraction with good efficiency.

The resulting fibers having a porous thermoplastic resin coating are, as required, washed with water, dried, and then wound up. When the coagulating liquid contains nonvolatile components such as salts, the fibers are desirably washed sufficiently with water after contact with the coagulating liquid.

Thus, the present invention provides the fiber or fiber bundle having a porous coating. The porous coating has porosity such that a group of micropores having a pore diameter in the range of 0.1 to 1 micrometer are present in a volume of 100 to 500 $mm^3/g$, preferably 150 to 400 $mm^3/g$.

The fibers obtained by applying the process of this invention to a plurality of fibers are bonded to one another having at least a part of the thermoplastic resin coating in common. The states of the coatings on the individual fibers are not the same but rather different. The amount of the thermoplastic resin is 5 to 100% by weight, preferably 10 to 80% by weight, especially preferably 20 to 70% by weight, based on the weight of the fibers.

Since the coating on the fiber or fiber bundle of this invention is porous, these fibers of the invention have flexibility and possess windability and drapability close to those of ordinary yarns. In spite of this, the fibers of this invention are tack-free. Accordingly, it is not necessary to take a troublesome measure of preventing adhesion of the fibers from each other before molding as in prepregs coated with a thermosetting resin by inserting spacers such as release paper sheets, and the fibers are easy to handle.

A fiber-reinforced composite material may be produced from the fiber bundle of this invention by placing the fiber bundle of this invention capable of being wound up or bent in various forms in a predetermined configuration, optionally curing it, and molding it at a temperature above the softening temperature of the thermoplastic resin coating optionally by applying a suitable external pressure. The resulting composite material are void-free in the fiber bundle and the fibers are uniformly cemented. A composite material having a higher proportion of the resin than the amount of the adhering resin may be obtained by placing the fiber bundle together with a film or a fiber of a thermoplastic resin identical or different from the thermoplastic resin coating, and heat-melting and consolidating the assembly. The fiber content of the composite material is generally 70 to 30% by weight, preferably 60 to 40% by weight. The new thermoplastic resin may be placed in the form of a fiber or slit film so as to wrap the fiber bundle of this invention. Alternatively, the thermoplastic resin film may be interposed between the fiber bundles of this invention aligned in one direction, and consolidating the assembly under heat and pressure. It is also possible to form a woven or knitted fabric by using the fiber or fiber bundle of this invention as a warp or a fiber of a thermoplastic resin as a weft with the reinforcing fibers aligned in one direction, stacking a number of such fabrics as requried, and consolidating the assembly under heat and pressure.

Most of the molding methods for composite materials reinforced with long fibers may be used in this invention. Examples are autoclave molding using prepregs, filament winding, compression molding, and molding in a mold.

Thus, there can be obtained a fiber-reinforced composite material which can be easily produced and handled, can permit employment of nearly the same processing methods as in the case of conventional thermosetting resin-coated fibers, can be molded within a short period of time as the characteristic of the thermoplastic matrix resin, and has a combination of the advantages of a conventional thermosetting resin prepreg and a thermoplastic prepreg and excellent toughness.

The fiber-reinforced composite material can be used widely as materials for functional parts utilizing its light weight and high strength in highly advanced technical fields, for example in aircraft, missiles, space stations, helicopters, ships, vehicles, automobiles, automation machines and instruments, electronics devices, and sporting goods.

The thermoplastic resin used in this invention may contain various additives such as a pigment or a stabilizer.

The volume of a group of micropores having a pore diameter of 0.1 to 1 micrometer, as referred to in this invention, is measured by a mercury porosimeter as follows:

A measuring sample is precisely weighed (about 0.5 g), and put in a measuring cell. The inside of the cell is deaerated, and then mercury is sealed into it. The cell is then set in a porosimeter (model 2000 made by Carlo Erba Co.), and a pressure ranging from atmospheric pressure to 1900 bar is applied over the course of about 40 minutes. The amount of mercury penetrated under pressure at the individual pressures is measured.

From the the equation $PD = -4\sigma \cos\theta$ showing the relation between the pore diameter D and pressure P, wherein $\sigma$ is the surface tension of mercury and $\theta$ is the angle of contact between the sample and mercury, the pressures corresponding to a pore diameter of 0.1 to 1 micrometer are calculated. From the difference in the amount of mercury penetrated at this time, the volume (mm$^3$/g) of micropores having a pore diameter of 0.1 to 1 micrometer is determined.

The following examples illustrate the present invention more specifically. It should be understood that the invention is not limited to these examples. In the examples, all parts are by weight.

EXAMPLE 1

Twenty parts of polybutylene terephthalate [having an inherent viscosity, measured at 35° C. in a mixed solvent of phenol and tetrachloroethane (60:40 by weight), of 1.08] was put into 80 parts of dried N-methyl-2-pyrrolidone (NMP). The mixture was heated to 170° C. to form a uniform solution having a viscosity of 110 centipoises. Carbon filaments (Torayca T-400, a product of Toray Inc.) were continuously immersed in the solution, and the filaments having impregnated therein the polymer solution were introduced into a water bath at 80° C. to coagulate polybutylene terephthalate. Then, the filaments were dried with hot air at 150° C. to obtain composite fibers having a porous polybutylene terephthalate coating formed on their surface. The composite fibers had a resin pick-up of 25.6%, but was as flexible as the carbon fibers before treatment, and could be wound up on a bobbin. The surface of the filaments was observed under a scanning electron microscope. Innumerable pores were observed. By a mercury porosimeter, the coating was found to have a number of micropores having a pore diameter in the range of 0.1 to 1 micrometer, and the volume of these micropores was 180 mm$^3$/gram of the polymer coating.

EXAMPLE 2

Composite fibers having a polysulfone resin coating formed on the surface of carbon fibers were obtained by the same method as in Example 1 except that a 22% by weight NMP solution (280 centipoises) of polysulfone resin (URDEL made by Union Carbide Corporation) at 85° C. was used instead of the polybutylene terephthalate solution. The pick-up of the polysulfone resin was 27.0% by weight. The composite fibers had flexibility. Observation under a scanning electron microscope showed that innumerable pores existed on the surface of the fibers and the polysulfone resin coating was porous. By a mercury porosimeter, the volume of a number of micropores having a pore diameter of 0.1 to 1 micrometer was found to be 242 mm$^3$/g of the polymer coating.

EXAMPLE 3

Composite fibers having a polyether imide resin coating formed on the surface of carbon fibers were obtained by the same method as in Example 1 except that a 20% by weight NMP solution (viscosity 300 centipoises) of polyether imide resin (ULTEM, made by General Electric Co.,) heated at 95° C. was used instead of the polybutalene terephthalate solution. The composite fibers had a polyether imide resin pick-up of 23.2%, but were fully flexible. Observation under a scanning electron microscope showed that the resin adhering to the surface of the carbon fibers was porous. By a mercury porosimeter, the volume of a number of micropores having a pore diameter of 0.1 to 1 micrometer was found to be 274 mm$^3$/g of the polymer coating.

EXAMPLE 4

Polybutylene terephthalate resin (inherent viscosity 1.08) was dissolved in a mixed solvent of phenol and tetrachloroethane (60:40 by weight) in a concentration of 20% by weight. The solution was heated to 100° C., and carbon fibers (Torayca T-400) were continuously immersed in it to impregnate the resin solution. The fibers were then immersed in methanol to deposit the polybutylene terephthalate resin as a coating onto the surface of the fibers. The fibers were well washed to remove the phenol/tetrachloroethane mixed solvent, and dried with hot air at 120° C. The resulting composite fibers had a polybutylene terephthalate resin pick-up of 19% by weight, and retained considerable flexibility. By a mercury porosimeter, the volume of a number of micropores having a pore diameter of 0.1 to 1 micrometer was found to be 227 mm$^3$/g of the polymer coating.

EXAMPLES 5-7

The composite fibers obtained in each of Examples 1 to 3 were maintained in a straight line, and heat-treated in hot air at 280° C. for 5 minutes to melt them. About 5g of the resulting fibers were aligned in one direction and stacked, and the assembly was put in a mold having a length of 125 mm and a width of 20 mm, and pressed under the conditions shown in Table 1 to obtain a prepreg having a thickness of about 2 mm. The cross section of the prepreg was observed under a scanning electron microscope. The state of resin impregnation was good in any of the samples, and there were hardly any voids observed. The fiber content (Vf), flexural strength, flexural modulus and interlayer shear strength of each of the prepregs were measured, and the results are shown in Table 1. It is seen that the prepregs of this invention have very superior mechanical properties.

TABLE 1

| Example | Composite fibers used | Vf (%) | Pressing conditions Temp. (°C.) | Pressure (kg/cm2) | Time (min.) | Flexural strength (kgf/mm2) | Flexural modulus (kgf/mm2) | Interlayer shear strength (kgf/mm2) |
|---|---|---|---|---|---|---|---|---|
| 5 | Example 1 | 68 | 260 | 40 | 5 | 82 | 14700 | 5.9 |
| 6 | Example 2 | 65 | 340 | 100 | 10 | 103 | 12800 | 6.8 |
| 7 | Example 3 | 70 | 340 | 100 | 10 | 91 | 13200 | 6.2 |

EXAMPLE 8

The carbon fibers obtained in Example 1 having a polybutylene terephthalate resin coating were wound in a thickness of about 2 mm about a stainless steel pipe having an average diameter of 20 mm and a length of 100 mm, and then heat-treated in hot air at 280° C. for 5 minutes. After cooling, the pipe was pulled out to form a pipe-like molded article. The pipe was very tough with the resin being melt-adhered.

EXAMPLE 9

The composite fibers obtained in Example 4 were maintained in a straight line and treated in hot air at 260° C. for 5 minutes. One hundred parts of these fibers and 19 parts of polybutylene terephthalate monofilaments were mixed, and aligned in one direction. The assembly was pressed as in Example 5 to form a prepreg. The prepreg had a flexural strength of 78 kgf/mm$^2$ and a flexural modulus of 11,400 kg/mm$^2$

EXAMPLE 10

Composite fibers having a polybutylene terephthalate coating formed on the fiber surface were obtained by the same method as in Example 1 except that poly(p-phenylene terephthalamide) (Kevlar 29, a product of E. I. du Pont de Nemours & Co.) were used as the reinforcing fibers. The composite fibers had a polybutylene terephthalate resin pick-up of 26.5% by weight, but had flexibility and could be wound up on a bobbin.

COMPARATIVE EXAMPLE 1

Eighteen carbon filaments (Torayca T-400) were aligned in one direction in a tape form, and interposed by unstretched films of polybutylene terephthalate having a thickness of about 150 microns. The assembly was set in a mold having a width of 20 mm and a length of 220 mm and pressed at a temperature of 260° C. under a pressure of 50 kg/cm$^2$ for 15 minutes. The cross section of the resulting molded article was observed under a scanning electron microscope. The state of resin impregnation was very poor, and the resin was hardly impregnated in the interstices of the filaments.

What is claimed is:

1. A bundle comprising a plurality of fibers, wherein at least a part of the surface of each fiber is coated with a coating of a thermoplastic resin, which is
    (A) different from the material forming said fiber,
    (B) present in a proportion of 5 to 100% by weight on an average based on said fiber and
    (C) porous such that a group of micropores having a pore diameter in the range of 0.1 to 1 micrometer are present in a volume of 100 to 500 mm$^3$/g on an average, said fibers being bonded to one another through the thermoplastic resin porous coating having at least a part of the porous coating in common.

2. A prepreg for a fiber-reinforced composite material, said prepreg comprising the bundle of fibers having a porous coating of a thermoplastic resin according to claim 1.

3. The bundle of fibers according to claim 1 wherein the individual fibers are inorganic fibers.

4. The bundle of fibers as set forth in claim 3 wherein the inorganic fibers are glass fibers, ceramic fibers, boron fibers or carbon fibers.

5. The bundle of fibers according to claim 4 wherein the individual fibers are comprised of carbon fibers.

6. The bundle of fibers as set forth in claim 1 wherein the individual fibers are comprised of organic fibers.

7. The bundle of fibers as set forth in claim 6 wherein the organic fibers are comprised of a polymer selected from the group consisting of aramide polymers, heterocyclic polymers, polyarylate fibers, polyazomethine, polyoxymethylene, polyethylene, polyvinyl alcohol, nylon and glycol-type polyesters.

8. The bundle of fibers as set forth in claim 1 wherein the fibers of the fiber bundle have a mechanical strength of at least 5 g/de and a diameter of from 0.5 to 5 de.

9. The bundle fibers as set forth in claim 1 wherein the thermoplastic resin of the porous coating is selected from the group consisting of polybutylene terephthalate, polyethylene terephthalate, polycarbonate, nylon, polyoxymethylene, polyarylate, polyarylene ether sulfone, polyamideimide, polyether imide, thermoplastic polyimides, polyester ketone, poly(p-phenylene sulfide), polyvinyl chloride, polyacrylates, polymethacrylates, polystyrene resins, modified polyethylene resins and polyester elastomers.

10. The bundle of fibers as set forth in claim 1 wherein the thermoplastic resin is an amorphous or sparingly crystalline resin having a glass transition temperature of at least 100° C.

11. The bundle of fibers as set forth in claim 1 wherein the thermoplastic resin is a highly crystalline resin having a crystalline melting point of at least 200° C.

12. The bundle of fibers as set forth in claim 1 wherein the amount of the thermoplastic resin coating is from about 10 to 80% by weight, based on the weight of the fibers.

13. The bundle of fibers as set forth in claim 1 wherein the amount of the thermoplastic resin coating is from about 20 to 70% by weight, based on the weight of the fibers.

14. The bundle of fibers as set forth in claim 1 wherein the porosity of the porous coating of the thermoplastic resin is such that a group of micropores having pore diameter in the range of 0.1 to 1 micrometer are present at a volume of 150 to 400 mm$^3$/g.

* * * * *

UNITED STATES PATENT AND TRADEMARK OFFICE
CERTIFICATE OF CORRECTION

PATENT NO. : 4,764,427
DATED : August 16, 1988
INVENTOR(S) : SHIGEYOSHI HARA ET AL.

It is certified that error appears in the above-identified patent and that said Letters Patent is hereby corrected as shown below:

Claim 5, in line 1 of the claim, "4" should be --1--.

Claim 9, line 7 of the claim, "polyester" should be --polyether--.

Signed and Sealed this

Sixth Day of December, 1988

Attest:

DONALD J. QUIGG

Attesting Officer     Commissioner of Patents and Trademarks